UNITED STATES PATENT OFFICE.

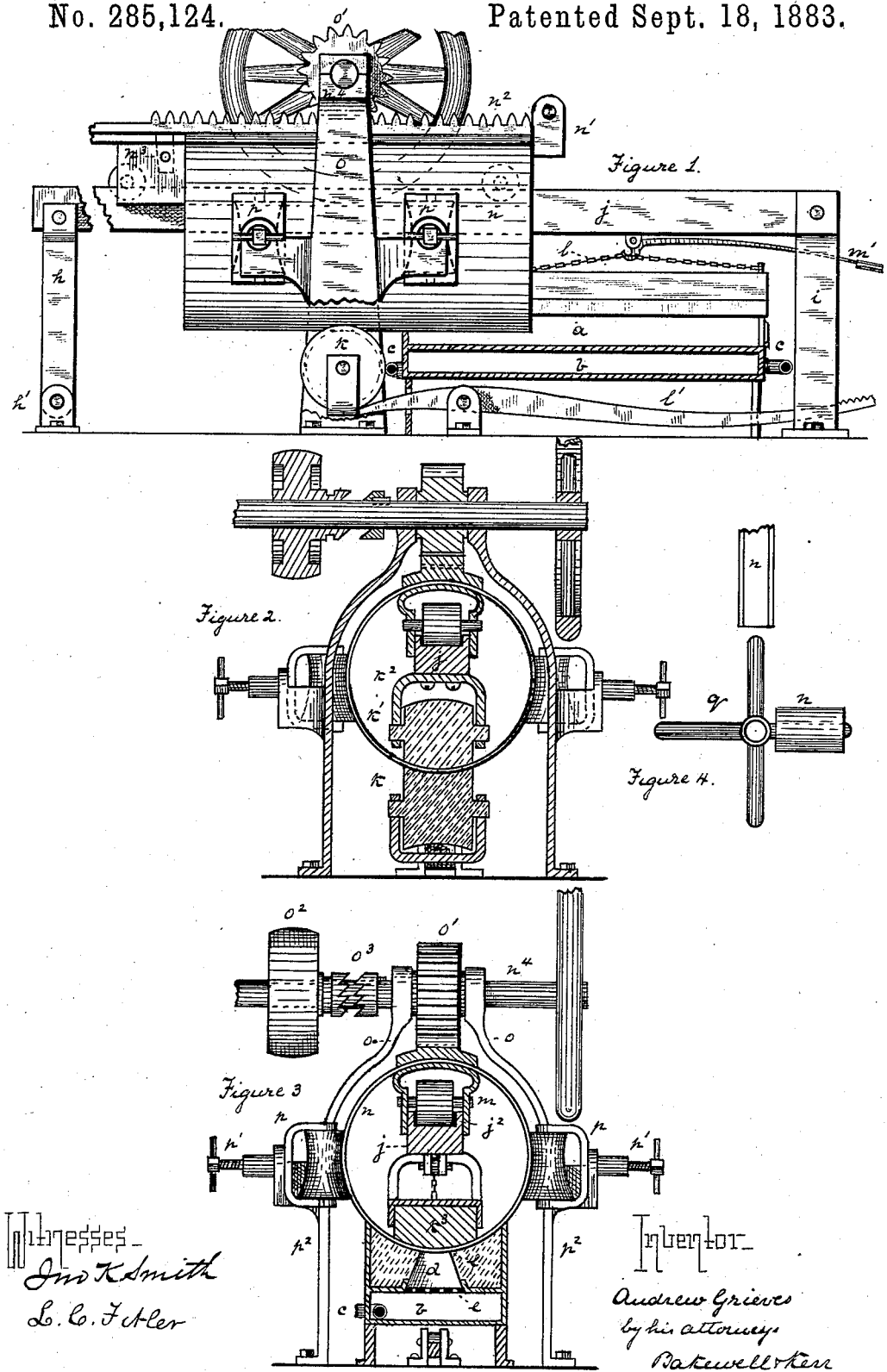

ANDREW GRIEVES, OF ALLEGHENY, PENNSYLVANIA.

WELDING APPARATUS.

SPECIFICATION forming part of Letters Patent No. 285,124, dated September 18, 1883.

Application filed April 21, 1883. (No model.)

*To all whom it may concern:*

Be it known that I, ANDREW GRIEVES, of Allegheny, in the county of Allegheny and State of Pennsylvania, have invented a new and useful Improvement in Welding Apparatus; and I do hereby declare the following to be a full, clear, and exact description thereof.

My invention relates to an improvement in welding apparatus; and it has for its object welding cylindrical bodies—such as boilers, boiler-rings, and other cylinders formed of sheet metal—by evenly heating the meeting surfaces to be welded in a suitable furnace and then passing the heated parts rapidly between rolls, so as to weld them together.

Heretofore it has been customary to join the seams of boilers and other cylinders by means of rivets, each one of which has to be driven separately, involving time and labor, and often an imperfect joint is formed. Pipes and tubing have been formed by heating the entire skelp in a furnace and welding the meeting edges by suitable mechanism; but this has been confined to tubing not larger than sixteen inches in diameter, and these tubes have been formed of skelp-iron, as sheet-iron, owing to its liability to bend and buckle, cannot be used. By my improved apparatus I am enabled to weld the longitudinal seam in boilers, boiler-rings, and other cylinders of all sizes, and I am not confined to iron of any special thickness.

I will now describe my invention, so that others skilled in the art may manufacture and use the same, reference being had to the accompanying drawings, forming part of this specification, in which—

Figure 1 is a side elevation of my improved apparatus. Fig. 2 is a cross-sectional view through the rolls. Fig. 3 is an end view, showing the furnace and boiler-shell in cross-section. Fig. 4 is a view of the rack for holding the shells.

Like letters of reference indicate like parts wherever they occur.

My apparatus consists in a furnace or heater adapted to heat the outer surfaces of the edges of the seams of the boiler-shells or other cylinders, and a radiator for the purpose of heating the interior edges of the boiler-seams to be welded, and a series of rolls for guiding the shell and welding the seam as it is drawn from the furnace.

The furnace or heater which constitutes part of my invention is formed of a cast-iron box, $a$, in the bottom of which is an air or wind chamber, $b$, into which, at each end, blast-pipes $c$ open for the purpose of supplying air to the furnace. Above the air-box is the fire-chamber $d$, the bottom of which is formed by suitable grate-bars, $e$, while the sides are formed of fire-brick tile, which slope upward at an angle to each other, so as to form the opening $f$ along the top of the furnace. These tiles are concave on their upper face, so as to coincide with the form of the boiler-shell the edges of which are to be welded. At each end of the furnace, on a line with the opening $f$, is an upright standard, $h\ i$, and extending from the top of one to the top of the other is a horizontal bar or way, $j$, over the longitudinal opening $f$ in the top of the furnace. Suspended from this bar over the entire length of the opening $f$ are a series of fire-brick tile, $k^3$, united and held in a suitable casing at their sides, top, and end, so as to form a radiator for the heat from the furnace. The lower faces of these tile are convex, so as to form space for the boiler-shell between the tile of the furnace and the tile of the radiator. This radiator is hung by means of the chain $l$ from the end of the lever $m'$, which lever is bolted to an eye in the horizontal bar $j$, so that the radiator may be raised from or lowered nearer to the furnace. The rear end of the furnace is closed by fire-brick tile, while the forward end is closed by an air-tight door. These tiles, which form the top of the furnace and the radiator, may be perforated by gas-jets, if it is desired to use gas as a fuel.

The devices which are used to weld the meeting edges of the shell together after they have been heated are situated at a point at the rear end of the furnace. They consist of two rolls, $k\ k'$, the lower one of which, $k$, has a concave face, and is journaled at the end of a horizontal lever, $l'$, so that the roll may be raised or lowered, while the upper roll, $k'$, having a convex face, is journaled in a bracket, $k^2$, projecting down from the horizontal bar $j$, so that the lower face of the roll shall be on a level with the concave surface of the top of the furnace. Along the top of the horizontal bar is a groove, $j^2$, in which are three or more wheels or rollers, which carry and are pivoted in the carriage $m$, on top of which carriage the shell $n$ rests. At one end of the carriage is a bracket or hinge, $n'$, which projects above the outer face of the shell, and to which is hinged a toothed bar or rack, $n^2$, which lies on the top of the shell, and is secured at its other end by a projecting piece, $n^3$, which fits in a slot in the top of the carriage, and is secured by a pin or key passing through the carriage and projection. Keyed to shaft, $n^4$, which is journaled on standards $o$ over the toothed bar $n^2$, is a gear-wheel, $o'$, which meshes into the teeth of the bar $n^2$, and is operated by power applied to the shaft by means of a band-wheel, $o^2$, and clutch $o^3$. At each side of and below the gear-wheel $o'$, and in juxtaposition to the welding-rolls, are situated vertical guide-rolls $p\,p$, having concave faces which bear on the sides of the shell, and serve to adjust and maintain the abutment or lap of the metal during the operation of the welding-rolls. These rolls are journaled in adjustable brackets secured by set-screws $p'\,p'$, passing through the standards $p^2\,p^2$, so that the rolls may be caused to press more or less tightly against the side of the shell. The standard $h$, at the rear end of the furnace, is hinged in a suitable bracket, $h'$, at its lower end, while it is secured to the horizontal bar $j$ at its upper end by a removable key.

The operation of my apparatus is as follows: The furnace is first heated by placing a fire therein, the fuel being of any desired kind—such as crushed coke—or hydrocarbon gases may be employed. The blast is started at both ends of the furnace, so as to produce as nearly as possible an equal heat throughout its length. After the furnace and radiator have become thoroughly heated the shell to be riveted is placed on the carriage $m$ under the toothed bar $n^2$, which is keyed down so as to hold the shell firmly in place, the meeting edges to be welded being downward on a vertical line with the axis of the shell. In order to do this, the standard $h$ must first be lowered. When the shell is in position on the carriage, the standard is again raised and keyed to the horizontal bar $j$. Care must be taken that the roll $k'$ bears on the seam to be welded, and that the vertical rolls are set at the proper gage, so as to either butt-weld or lap-weld the shell, and thereby after the heating operation is completed the welding operation may be effectual. The shell is then carried (by moving the carriage) over the furnace, the seam being directly over the longitudinal opening in the top of the furnace, while the radiator is inside of the shell directly over the seam. The blast is then so regulated by suitable gates as to keep the furnace at a proper temperature until the seam has been raised to a welding-heat on its inner and outer surfaces throughout its entire length. The seam having been heated, in order to weld the edges together, the clutch $o^3$ is thrown into gear with the band-wheel $o^2$, and the carriage is driven in the reverse direction toward the standard $h$, pressure being at the same time applied to the end of the lever $l'$, so as to cause the lower roll, $k$, to bear firmly upward, while the upper roll, $k'$, bears upon the seam on the inside of the shell, and as the heated parts are carried between the rolls they are firmly welded together. In case a butt-weld is desired, the side vertical rolls keep the edges true against each other, and in case of a lap-weld the seam is kept straight and even. The standard $h$ is then again lowered, and the shell is moved from the carriage onto one of the projecting arms of the turn-table or rack $q$. Another shell is then treated in the same manner. Where the shell is of light metal, a friction-roller keyed to the shaft $n^4$ may be employed to carry the shell from the furnace through the rolls.

The purpose of suspending the radiator by means of the chain $l$ is to allow of its being adjusted according to the thickness of the sheet metal of which the shell is composed. In order that this welding operation, as described, shall be perfect, it is necessary that the edges of the seam should be evenly heated to the proper temperature, and that while at this temperature they should be rapidly carried from the furnace through the welding-rolls.

The advantages of my invention are that cylinders, boiler-shells, and other tubing may be easily and cheaply formed without the use of rivets.

Having thus described my invention, what I claim, and desire to secure by Letters Patent, is—

1. In apparatus for welding cylinders, &c., the combination of a welding-furnace having a suitable flame-slot, a track arranged above the welding-furnace, a radiator suspended from the track and over the flame-slot of the furnace, and a work-carriage arranged to traverse the elevated track, so as to suspend the cylinder to be welded and carry the same over the furnace and between the furnace and radiator, substantially as and for the purposes specified.

2. In apparatus for welding cylinders, &c., the combination of a welding-furnace having a suitable flame-slot, an elevated track arranged above the same, a radiator adjustably suspended from the track, a work-carriage arranged to traverse the elevated track, a welding-roll supported from the track in line with the top of the welding-furnace, and an adjustable welding-roll arranged below the first roll to coact therewith, substantially as and for the purposes specified.

3. In combination with a seam-heating furnace and welding-rolls arranged in line therewith, a series of guide-rolls arranged at the sides of the welding-rolls and close to the same, so as to maintain the abutment or lap of the metal during the welding operation of the rolls, substantially as and for the purposes specified.

4. The combination, with a seam-heating furnace and welding-rolls, of an elevated track arranged above the same, and a truck or carriage adapted to traverse the track and suspend and carry the cylinder to be welded, substantially as and for the purposes specified.

5. The combination, with a truck or carriage for conveying cylinders to and from the welding devices, of a pivoted rack or bar adapted to clamp the cylinder to the carriage, and to afford means for applying power to propel the truck or carriage, substantially as and for the purposes specified.

In testimony whereof I have hereunto set my hand this 9th day of April, A. D. 1883.

ANDREW GRIEVES.

Witnesses:
 JOHN S. KENNEDY,
 JAMES K. BAKEWELL.